US012665110B2

(12) United States Patent
Kainuma et al.

(10) Patent No.: US 12,665,110 B2
(45) Date of Patent: Jun. 23, 2026

(54) PERMANENT MAGNET ALLOY, METHOD FOR PRODUCING THE SAME, PERMANENT MAGNET, AND METHOD FOR PRODUCING THE SAME

(71) Applicants: TOHOKU UNIVERSITY, Sendai (JP); PROTERIAL, LTD., Tokyo (JP)

(72) Inventors: Ryosuke Kainuma, Sendai (JP); Toshihiro Omori, Sendai (JP); Xiao Xu, Sendai (JP); Naoki Hashimoto, Sendai (JP); Tomohito Maki, Tokyo (JP)

(73) Assignees: TOHOKU UNIVERSITY, Miyagi (JP); PROTERIAL, LTD., Tokyo (JP)

( * ) Notice: Subject to any disclaimer, the term of this patent is extended or adjusted under 35 U.S.C. 154(b) by 1131 days.

(21) Appl. No.: 17/640,382

(22) PCT Filed: Sep. 10, 2021

(86) PCT No.: PCT/JP2021/033394

§ 371 (c)(1),
(2) Date: Mar. 4, 2022

(87) PCT Pub. No.: WO2022/065089

PCT Pub. Date: Mar. 31, 2022

(65) Prior Publication Data

US 2022/0415547 A1 Dec. 29, 2022

(30) Foreign Application Priority Data

Sep. 25, 2020 (JP) ................................ 2020-160621
Mar. 16, 2021 (JP) ................................ 2021-042837

(51) Int. Cl.
*H01F 1/047* (2006.01)
*H01F 41/02* (2006.01)

(52) U.S. Cl.
CPC ......... *H01F 1/047* (2013.01); *H01F 41/0253* (2013.01)

(58) Field of Classification Search
None
See application file for complete search history.

(56) References Cited

U.S. PATENT DOCUMENTS 4,133,703 A 1/1979 Kojima et al.
2021/0062305 A1 3/2021 Fang et al.

FOREIGN PATENT DOCUMENTS

CN 106997800 A * 8/2017 ............... C22C 1/03
CN 111655877 A 9/2020

(Continued)

OTHER PUBLICATIONS

Official Communication issued in corresponding Japanese Patent Application No. 2022-514550, mailed on Jul. 11, 2023.

(Continued)

*Primary Examiner* — Keith D. Hendricks
*Assistant Examiner* — Janell C Morillo
(74) *Attorney, Agent, or Firm* — Keating & Bennett, LLP

(57) ABSTRACT

A permanent magnet alloy according to the present disclosure contains Mn at a content not lower than 41% by atom and not higher than 53% by atom; Al at a content not lower than 46% by atom and not higher than 53% by atom; and Cu at a content not lower than 0.5% by atom and not higher than 10% by atom. The alloy contains a stable phase, having a tetragonal structure, at a ratio not lower than 50%.

7 Claims, 1 Drawing Sheet

(56) References Cited

FOREIGN PATENT DOCUMENTS

| | | | |
|---|---|---|---|
| JP | 39-012223 | B | 7/1964 |
| JP | 41-21965 | B | 12/1966 |
| JP | 53-28014 | A | 3/1978 |
| JP | 59-04946 | A | 1/1984 |
| JP | 63-104405 | A | 5/1988 |

OTHER PUBLICATIONS

Official Communication issued in corresponding Japanese Patent Application No. 2022-514550, mailed on Jan. 31, 2023.
Official Communication issued in International Patent Application No. PCT/JP2021/033394, mailed on Dec. 7, 2021.
Metallurgical Industry Press, "Encyclopedia of Chinese Metallurgy: Metallic Materials", ISBN 7-5024-2544-6, Mar. 2001, 8 pages.

* cited by examiner

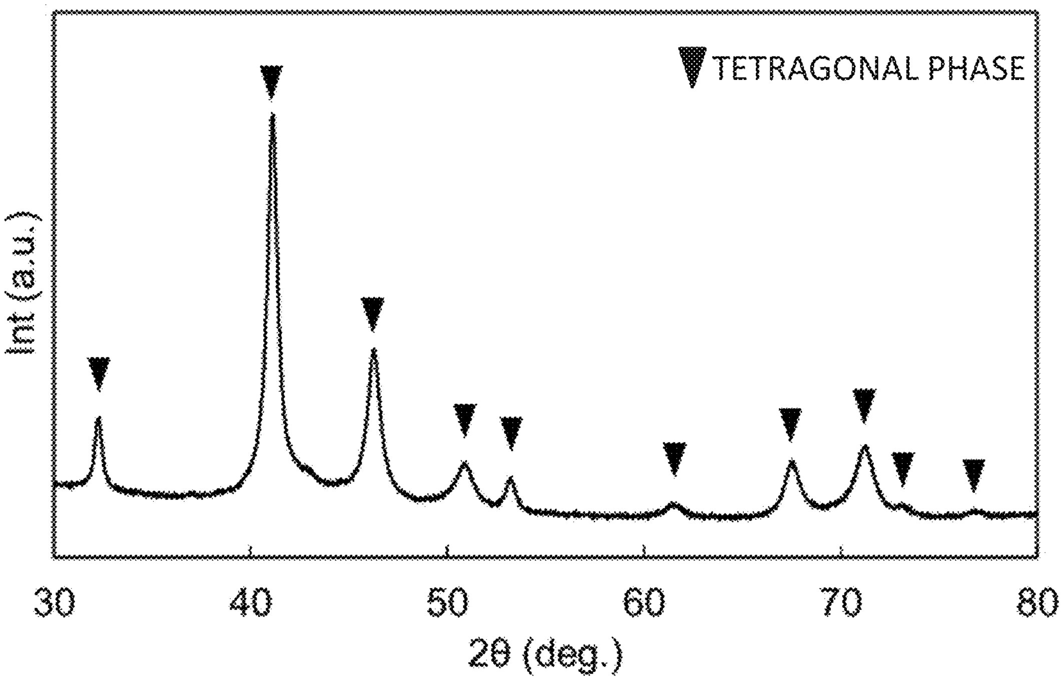
TETRAGONAL PHASE
Int (a.u.)
30
40
50
60
70
80
2θ (deg.)

PERMANENT MAGNET ALLOY, METHOD FOR PRODUCING THE SAME, PERMANENT MAGNET, AND METHOD FOR PRODUCING THE SAME

TECHNICAL FIELD

The present disclosure relates to a permanent magnet alloy for a permanent magnet, a method for producing the same, a permanent magnet, and a method for producing the same.

BACKGROUND ART

Rare earth element-based permanent magnets such as, for example, Nd—Fe—B-based and Sm—Co-based permanent magnets are used for electric motors of automobiles, railroad equipment, home appliances, industrial equipment and the like, and contribute to decrease in the size thereof and increase in the performance thereof. However, rare earth elements usable for rare earth element-based permanent magnets are not supplied stably for a reason that, for example, such rare earth elements are produced in limited areas. Although the market for permanent magnets is expected to expand worldwide, there is a risk that the rare earth elements as the materials of the permanent magnets may not be supplied sufficiently in the future and also a risk that the costs thereof may be raised. Therefore, permanent magnets that use rare earth elements to the minimum possible degree are desired.

A Manganese-Aluminum-based permanent magnet (Mn—Al-based permanent magnet) is conventionally known as not using any rare earth element. Such a Mn—Al-based permanent magnet contains, as a main phase, a ferromagnetic τ-MnAl phase having a tetragonal structure. The τ-MnAl phase is a metastable phase, and appears when a high temperature phase having a hexagonal structure of a composition having an atomic ratio of Mn:Al=55:45 or the vicinity thereof is cooled down. Patent Document 1 discloses a Mn—Al—C-based permanent magnet having the stability of the τ-MnAl phase improved as a result of incorporation of Carbon (C).

Patent Document 2 discloses a method, using a liquid quenching technique, for producing a Cu—Al—Mn-based magnet alloy containing Cu at a content of 0.1 to 65% by weight, Al at a content of 15 to 50% by weight, multi-component elements at a total content of 5% by weight, and Mn as a remaining part.

CITATION LIST

Patent Literature

Patent Document No. 1: Japanese Patent Publication for Opposition No. Sho 39-012223

Patent Document No. 2: Japanese Laid-Open Patent Publication No. Sho 59-004946

SUMMARY OF INVENTION

Technical Problem

The Mn—Al-based permanent magnet has a problem that the magnetic characteristics thereof are easily decreased. A reason for this is that the τ-MnAl phase as the main phase is a metastable phase, and when being heat-treated, for example, at 600° C. for 10 hours, may be changed into a γ-$Mn_5Al_8$ phase and a β-Mn phase, which are non-ferromagnetic and stable phases. The Mn—Al—C-based permanent magnet disclosed in Patent Document 1 has the stability of the τ-MnAl phase thereof improved by incorporation of C, but the T-MnAl phase is still a metastable phase and may be changed into a non-ferromagnetic phase when being heat-treated. Therefore, it is difficult to provide a Mn—Al—C-based permanent magnet having high magnetic characteristics.

The method for producing the Cu—Al—Mn-based magnet alloy disclosed in Patent Document 2 indispensably requires quenching, and the Cu—Al—Mn-based magnet alloy has very low magnetic characteristics. For these reasons, the Cu—Al—Mn-based magnet alloy has a low possibility of being practically usable as a magnet alloy.

The present disclosure provides a permanent magnet alloy having a highly stable tetragonal structure with no use of a rare earth element, a method for producing the same, a permanent magnet containing such an alloy, and a method for producing the same.

Solution to Problem

In a non-limiting and illustrative embodiment, a permanent magnet alloy according to the present disclosure contains Mn at a content not lower than 41% by atom and not higher than 53% by atom; Al at a content not lower than 46% by atom and not higher than 53% by atom; and Cu at a content not lower than 0.5% by atom and not higher than 10% by atom. The permanent magnet alloy contains a stable phase, having a tetragonal structure, at a ratio not lower than 50%.

In an embodiment, the permanent magnet alloy contains Mn at a content not lower than 44% by atom and not higher than 53% by atom; Al at a content not lower than 46% by atom and not higher than 51.5% by atom; and Cu at a content not lower than 0.5% by atom and not higher than 7% by atom.

In an embodiment, the permanent magnet alloy contains Mn at a content not lower than 45% by atom and not higher than 51.5% by atom; Al at a content not lower than 46% by atom and not higher than 50% by atom; and Cu at a content not lower than 0.5% by atom and not higher than 5% by atom.

In an embodiment, the permanent magnet alloy further contains C at a content lower than 1% by atom (including 0% by atom).

In an embodiment, a total content of Mn, Al, Cu and C is 100% by atom (the permanent magnet alloy may contain unavoidable impurities).

In a non-limiting and illustrative embodiment, a method for producing a permanent magnet alloy according to the present disclosure includes a first step of preparing a first alloy such that the permanent magnet alloy contains Mn at a content not lower than 41% by atom and not higher than 53% by atom, Al at a content not lower than 46% by atom and not higher than 53% by atom, and Cu at a content not lower than 0.5% by atom and not higher than 10% by atom; and a second step of heat-treating the first alloy at a temperature not lower than 300° C. and not higher than 750° C. in vacuum or in inert gas to provide a second alloy.

In an embodiment, in the first step, the first alloy is prepared such that the permanent magnet alloy contains Mn at a content not lower than 44% by atom and not higher than 53% by atom, Al at a content not lower than 46% by atom and not higher than 51.5% by atom, and Cu at a content not lower than 0.5% by atom and not higher than 7% by atom.

In an embodiment, in the first step, the first alloy is prepared such that the permanent magnet alloy contains Mn at a content not lower than 45% by atom and not higher than 51.5% by atom, and Al at a content not lower than 46% by atom and not higher than 50% by atom, and Cu at a content not lower than 0.5% by atom and not higher than 5% by atom.

In an embodiment, in the first step, the first alloy is prepared such that the permanent magnet alloy contains C at a content lower than 1% by atom (including 0% by atom).

In an embodiment, in the first step, the first alloy is prepared such that a total content of Mn, Al, Cu and C in the permanent magnet alloy is 100% by atom (the permanent magnet alloy may contain unavoidable impurities).

In a non-limiting and illustrative embodiment, a permanent magnet according to the present disclosure contains Mn at a content not lower than 41% by atom and not higher than 53% by atom; Al at a content not lower than 46% by atom and not higher than 53% by atom; and Cu at a content not lower than 0.5% by atom and not higher than 10% by atom. The permanent magnet contains a stable phase, having a tetragonal structure, at a ratio not lower than 50%.

In an embodiment, the permanent magnet contains Mn at a content not lower than 44% by atom and not higher than 53% by atom; and Al at a content not lower than 46% by atom and not higher than 51.5% by atom; and Cu at a content not lower than 0.5% by atom and not higher than 7% by atom.

In an embodiment, the permanent magnet contains Mn at a content not lower than 45% by atom and not higher than 51.5% by atom; Al at a content not lower than 46% by atom and not higher than 50% by atom; and Cu at a content not lower than 0.5% by atom and not higher than 5% by atom.

In a non-limiting and illustrative embodiment, a method for producing a permanent magnet according to the present disclosure includes an alloy preparation step of preparing a permanent magnet alloy by any one of the methods described above; and a densification step of putting powder of the permanent magnet alloy into a dense texture state.

Advantageous Effects of Invention

According to the present disclosure, a permanent magnet alloy having a highly stable tetragonal structure with no use of a rare earth element, a method for producing the same, a permanent magnet made from the alloy, and a method for producing the same are provided.

BRIEF DESCRIPTION OF DRAWINGS

FIG. 1 shows results of measurement performed on a crystal structure of a second alloy in example 1 by use of an x-ray diffraction device.

DESCRIPTION OF EMBODIMENTS

The present inventors have found out that in the case where the elements of Mn, Al and Cu are provided in a proper and limited composition range and are properly heat-treated, a tetragonal structure having high saturation magnetization preferred for a permanent magnet alloy is provided as a stable phase at a high ratio not lower than 50%. In the present disclosure, the "stable phase" refers to a tetragonal phase that has a tetragonal structure and is present even after being kept isothermally in a heat treatment temperature range not lower than 500° C. and not higher than 750° C. for a time period not shorter than 24 hours.

Permanent Magnet Alloy

A reason the composition of the permanent magnet alloy (alloy for permanent magnets) according to embodiments of the present invention is limited will be described below.

Mn is contained at a content not lower than 41% by atom and not higher than 53% by atom. In the case where the content of Mn is lower than 41% by atom or higher than 53% by atom, the ratio of a heterogenous phase having low saturation magnetization ($\tau$-$Mn_5Al_8$ phase or $\beta$-Mn phase) is increased, and thus a stable phase having a tetragonal structure is not provided at a ratio not lower than 50%. In this case, the alloy does not have sufficient magnetization for a permanent magnet. For higher magnetization, the content of Mn is preferably not lower than 44% by atom and not higher than 53% by atom, and more preferably not lower than 45% by atom and not higher than 51.5% by atom.

Al is contained at a content not lower than 46% by atom and not higher than 53% by atom. In the case where the content of Al is lower than 46% by atom or higher than 53% by atom, the ratio of a heterogenous phase having low saturation magnetization is increased, and thus a stable phase having a tetragonal structure is not provided at a ratio not lower than of 50%. In this case, the alloy does not have sufficient magnetization for a permanent magnet. For higher magnetization, the content of Al is preferably not lower than 46% by atom and not higher than 51.5% by atom, and more preferably not lower than 46% by atom and not higher than 50% by atom.

Cu is contained at a content not lower than 0.5% by atom and not higher than 10% by atom. In the case where the content of Cu is lower than 0.5% by atom or higher than 10% by atom, the ratio of a heterogenous phase having low saturation magnetization is increased, and thus a stable phase having a tetragonal structure is not provided at a ratio not lower than of 50%. In this case, the alloy does not have sufficient magnetization for a permanent magnet. For higher magnetization, the content of Cu is preferably not lower than 0.5% by atom and not higher than 7% by atom, and more preferably not lower than 0.5% by atom and not higher than 5% by atom.

In a state where the contents of Mn, Al and Cu are each set to the above-described specific range, C may be further incorporated. However, in the case where the content of C is too high, the Curie temperature of the tetragonal phase is significantly decreased to decrease the magnetic characteristics of the permanent magnet at a high temperature. The content of C is preferably lower than 1% by atom including 0% by atom, and more preferably 0.8% by atom including 0% by atom.

Mn, Al, Cu and a part of C may be replaced with another element. However, it is preferred that the permanent magnet alloy does not contain another element. Namely, it is preferred that a total content of Mn, Al, Cu and C is 100% by atom (it should be noted that the alloy may contain unavoidable impurities).

The form of the permanent magnet is not limited to a bulk, and may be rod-like, film-like, powder particle-like, or the like.

Method for Producing a Permanent Magnet Alloy

An embodiment of a method for producing a permanent magnet alloy according to the present disclosure will be described below.

First Step

In the present disclosure, a "first step" is to obtain a first alloy having a composition encompassed in the above-described composition range for the permanent magnet alloy.

The first alloy contains Mn, Al and Cu each at the content in the above-described specific range and may further contain C.

The composition of the first alloy is the same as that of the above-described permanent magnet alloy, and thus will not be described.

First, the materials are melted such that the first alloy has a composition in the above-described range, and are cast. The melting and the casting may be performed by an arbitrary method. For example, the melting is performed by high-frequency melting or arc melting, and the casting is performed by a method such as strip cast, liquid rapid quenching or the like. After being cast, the first alloy may be heat-treated at a temperature not lower than 800° C. for homogenizing the microstructure.

Second Step

In the present disclosure, a "second step" is to heat-treat the first alloy in vacuum or in inert gas to obtain a second alloy containing a stable phase, having a tetragonal structure, at a ratio not lower than 50%.

In the first alloy, a high temperature phase having small saturation magnetization or small magnetocrystalline anisotropy may occasionally remain, and in such a case, a stable phase having a tetragonal structure is not obtained at a high ratio. The first alloy having a composition in the above-described specific range is heat-treated in vacuum or in inert gas such as argon gas or the like. As a result, a phase transition to a tetragonal structure occurs in the first alloy, and thus a stable phase having a tetragonal structure is obtained at a high ratio. The heat treatment temperature is preferably not lower than 300° C. and not higher than 750° C. In the case where the heat treatment temperature is lower than 300° C., the change to the tetragonal structure takes a long time and thus mass-production of the permanent magnet may be made difficult undesirably. In the case where the heat treatment temperature is higher than 750° C., a high temperature phase is generated, and thus a stable phase having a tetragonal structure is not obtained at a high ratio. The time period in which the first alloy is kept at the heat treatment temperature may be appropriately set in accordance with the composition and the heat treatment temperature, such that a stable phase having a tetragonal structure is obtained at a ratio not lower than 50%. Such a time period of the heat treatment is, for example, 1 hour to 336 hours. The second alloy may be pulverized by a known method, and may further be heat-treated in order to be deprived of strain caused by the pulverization.

Whether or not the phase having the tetragonal structure is a stable phase may be checked based on, for example, whether or not the phase is still present even after being heat-treated for a long time (not shorter than 24 hours) in the second step. Whether or not the phase having the tetragonal structure is a stable phase may also be checked based on, for example, whether or not the phase is still present even after being additionally heat-treated for a long time (not shorter than 24 hours) after the second step. In the present disclosure, the "stable phase" is a tetragonal phase that has a tetragonal structure and is still present even after being isothermally kept at a heat treatment temperature in the range not lower than 500° C. and not higher than 750° C. for a time period not shorter than 24 hours as described above.

The crystal structure of the tetragonal phase may be checked by use of x-ray diffraction or electron beam diffraction. Specifically, in the case where a diffraction pattern obtained by x-ray diffraction or electron beam diffraction matches a known diffraction pattern of the tetragonal structure, the crystal structure may be confirmed as being a tetragonal structure. Similarly, whether or not the phase is a β-Mn phase or a $\gamma$-$Mn_5Al_8$ phase may be checked based on whether the diffraction pattern thereof matches a known diffraction pattern of the β-Mn phase or the $\gamma$-$Mn_5Al_8$ phase.

The ratio of the tetragonal phase may be checked by a Rietveld analysis of the x-ray diffraction. Specifically, a diffraction pattern obtained by the x-ray diffraction is subjected to fitting with a least squares method by use of a diffraction pattern calculated based on a crystal structure model of a tetragonal phase and a crystal structure model of a phase other than the tetragonal phase. Based on the strength ratio of such phases, the ratio of the tetragonal phase is obtained.

Permanent Magnet

A permanent magnet according to the present disclosure may be provided by, for example, the embodiment of the permanent magnet described below by use of a permanent magnet alloy produced by the above-described production method. The composition range for the permanent magnet is the same as the composition range for the permanent magnet alloy. The permanent magnet also includes, as a main phase, a stable phase having the tetragonal structure, and the ratio of the stable phase in the permanent magnet is not lower than 50%. The permanent magnet is a dense texture state of the permanent magnet alloy. The reason the composition or the like of the permanent magnet is limited is the same as the reason for the permanent magnet alloy, and thus will not be described.

Method for Producing a Permanent Magnet

An embodiment of a method for producing a permanent magnet according to the present disclosure will be described below.

A method for producing a permanent magnet according to the present disclosure includes an alloy preparation step of preparing a permanent magnet alloy produced by the above-described method, and a densification step of putting powder of the permanent magnet alloy into a dense texture state. In the alloy preparation step, the second alloy is prepared. In the densification step, the powder of the second alloy is put into the dense texture state by a known method. In the densification step, the powder of the second alloy may be pressed into a compact and then sintered, or may be pressed and sintered at the same time. Alternatively, the powder of the second alloy may be pressed in a state of being mixed or kneaded with a resin, and thus put into the dense texture state.

In the densification step, the powder of the second alloy is sintered preferably at the same heat treatment temperature as in the second step (not lower than 300° C. and not higher than 750° C.). In the case where, for example, the sintering is performed at a relatively high temperature not lower than 800° C., a high temperature phase is generated after the sintering and as a result, the ratio of the stable phase having a tetragonal structure may be significantly decreased. In such a case, the same heat treatment as in the second step (not lower than 300° C. and not higher than 750° C.) may be performed after the sintering. In either case, a permanent magnet as a dense texture state of the permanent magnet alloy is obtained. In order to promote the densification at the time of sintering, a method such as hot pressing or the like may be used. The second alloy obtained by the second step, or the permanent magnet obtained by the densification step, may be subjected to mechanical processing such as cutting, shaving or the like, or a known surface treatment such as, for example, plating for the purpose of providing corrosion resistance.

EXAMPLES

The present disclosure will be described in more detail by way of examples. The present invention is not limited to any of the examples in any way.

Example 1

The elements of Mn, Al and Cu were weighed, and then melted and cast by use of a high frequency induction melting furnace to obtain an ingot. The obtained ingot was encapsulated in a quartz tube having an argon gas atmosphere, and subjected to a homogenization process to be kept at 900° C. for 24 hours in a heating furnace. As a result, a first alloy was obtained (first step). Then, the obtained first alloy was subjected to a heat treatment to be kept at 600° C. for 168 hours. As a result, a second alloy was obtained (second step). The components of the obtained second alloy were measured by use of inductively coupled plasma optical emission spectrometry (ICP-OES). The components were $Mn_{49.1}Al_{48.4}Cu_{2.5}$ (% by atom).

The second alloy obtained by the second step was pulverized into a size not larger than 75 μm. The crystal structure thereof was measured by use of an x-ray diffraction device, and the phase ratio thereof was analyzed by use of a Rietveld analysis. FIG. 1 shows the results of the measurement performed on the crystal structure of the second alloy in example 1 by use of the x-ray diffraction device. As shown in FIG. 1, the second alloy exhibited a diffraction pattern matching a known diffraction pattern of the tetragonal structure. The second alloy was confirmed to have a tetragonal phase still present even after being kept at 600° C. for 168 hours, namely, a stable phase. The Rietveld analysis showed no peak other than the peaks of the tetragonal structure. Based on this, the phase ratio of the tetragonal phase was 100%. The ingot of the second alloy was rough-pulverized, and particles each having a diameter of about 1.5 μm were taken out. The magnetic characteristics of these particles were measured by use of a vibrating sample magnetometer capable of applying a high magnetic field. The particles exhibited a high value of magnetization of 127.0 A·m²/kg at an applied magnetic field of 9 T.

Example 2

A first alloy and a second alloy were produced in substantially the same manner as in example 1 except that the weights of the elements of Mn, Al and Cu were different. The components, the crystal structure, the phase ratio, and the magnetic characteristics of the obtained second alloy were measured in substantially the same manner as in example 1. The components were $Mn_{49.7}Al_{48.8}Cu_{1.5}$ (% by atom), and the main phase was confirmed to be a tetragonal phase. The phase ratio of the tetragonal phase was 99%. The value of magnetization was 117.2 A·m²/kg at an applied magnetic field of 9 T.

Examples 3 Through 5

The elements of Mn, Al and Cu were weighed so as to have the same composition as in example 1, and then quenched by use of a compact rapid quenching device. As a result, a first alloy was obtained (first step). The components of the obtained first alloy were measured by use of inductively coupled plasma optical emission spectrometry (ICP-OES). The components were $Mn_{48.9}Al_{48.7}Cu_{2.4}$ (% by atom), which was almost the same as in example 1. The obtained first alloy was put into a quartz tube. The inside of the quartz tube was made vacuum by use of a rotary pump, and then provided with an argon gas atmosphere. The second alloy was subjected to a heat treatment to be kept at 600° C. for 1 to 168 hours in a heating furnace. As a result, a plurality of pieces of second alloy were obtained (second step).

The phase of the second alloy was identified by use of an x-ray diffraction device, and the phase ratio thereof was found by a Rietveld analysis. The magnetic characteristics thereof were measured by use of a vibrating sample magnetometer. Table 1 shows the results of the measurements. In each of the examples, a high ratio of the tetragonal phase not lower than 90% was obtained. With each of the alloy compositions providing the tetragonal phase as a stable phase, a high ratio of the tetragonal phase was obtained even in the case where the heat treatment was performed for a relatively short time period. The second alloy was magnetized by use of a pulse magnetizer applying a magnetic field of 7 T, and the magnetic characteristics thereof were measured by use of a vibrating sample magnetometer applying a magnetic field of 2 T at the maximum. The maximum value of magnetization was as high as not lower than 75 A·m²/kg.

TABLE 1

| | ALLOY COMPOSITION (% BY ATOM) | | | HEAT TREATMENT | | RATIO OF TETRAGONAL | MAXIMUM VALUE OF MAGNETIZATION |
|---|---|---|---|---|---|---|---|
| | Mn | Al | Cu | TEMPERATURE (° C.) | TIME (h) | PHASE (%) | (A · m²/kg) |
| EX 3 | 48.9 | 48.7 | 2.4 | 600 | 1 | 90 | 75.9 |
| EX 4 | 48.9 | 48.7 | 2.4 | 600 | 24 | 99 | 82.9 |
| EX 5 | 48.9 | 48.7 | 2.4 | 600 | 168 | 97 | 83.3 |

Examples 6 Through 16

The elements of Mn, Al and Cu were weighed, and then quenched by use of a compact rapid quenching device. As a result, a plurality of pieces of first alloy were obtained (first step). The components of the obtained first alloy were measured by use of inductively coupled plasma optical emission spectrometry (ICP-OES). The compositions were as shown in Table 2. The obtained first alloy was subjected to a heat treatment to be kept at 600° C. for 1 hour in substantially the same manner as in examples 3 through 5. As a result, a plurality of pieces of second alloy were obtained (second step).

The phase of the second alloy was identified by use of an x-ray diffraction device, and the phase ratio thereof was found by a Rietveld analysis. The magnetic characteristics thereof were measured by use of a vibrating sample magnetometer. The results of the measurements are shown in Table 2. In each of the examples, a high ratio of the tetragonal phase not lower than 50% was obtained. In order to check whether or not the tetragonal phase was a stable phase, a part of the pieces of the second alloy that had been heat-treated at 600° C. for 168 hours separately was subjected to the measurements in substantially the same manner. In each of the examples, a high ratio of the tetragonal phase not lower than 50% was obtained.

TABLE 2

| | ALLOY COMPOSITION (% BY ATOM) | | | HEAT TREATMENT | | RATIO OF | MAXIMUM VALUE OF |
|---|---|---|---|---|---|---|---|
| | | | | TEMPERATURE | TIME | TETRAGONAL | MAGNETIZATION |
| | Mn | Al | Cu | (° C.) | (h) | PHASE (%) | (A · m$^2$/kg) |
| EX 6 | 52.5 | 46.5 | 1.0 | 600 | 1 | 72 | 61.3 |
| EX 7 | 51.5 | 47.1 | 1.5 | 600 | 1 | 65 | 59.3 |
| EX 8 | 50.5 | 48.1 | 1.5 | 600 | 1 | 54 | 48.7 |
| EX 9 | 49.3 | 49.2 | 1.5 | 600 | 1 | 63 | 55.8 |
| EX 10 | 52.0 | 46.1 | 2.0 | 600 | 1 | 75 | 61.1 |
| EX 11 | 51.0 | 46.6 | 2.4 | 600 | 1 | 89 | 73.9 |
| EX 12 | 49.9 | 47.7 | 2.5 | 600 | 1 | 96 | 83.2 |
| EX 13 | 47.8 | 49.7 | 2.5 | 600 | 1 | 79 | 58.6 |
| EX 14 | 50.4 | 46.7 | 3.0 | 600 | 1 | 84 | 73.3 |
| EX 15 | 47.3 | 49.7 | 3.0 | 600 | 1 | 69 | 54.3 |
| EX 16 | 46.7 | 49.8 | 3.5 | 600 | 1 | 76 | 48.9 |

Examples 17 Through 20 and Comparative Examples 1 and 2

The elements of Mn, Al, Cu and C were weighed, and then quenched by use of a compact rapid quenching device. As a result, a plurality of pieces of first alloy were obtained (first step). Among the components of the obtained first alloy, Mn, Al and Cu were measured by use of inductively coupled plasma optical emission spectrometry (ICP-OES), and C was measured by use of an infrared absorption method after combustion. The compositions were as shown in Table 3. The obtained first alloy was put into a quartz tube. The inside of the quartz tube was made vacuum by use of a rotary pump, and then provided with an argon gas atmosphere. The first alloy was subjected to a heat treatment to be kept at 600° C. for 1 hour in a heating furnace. As a result, a plurality of pieces of second alloy were obtained (second step).

The phase of the second alloy was identified by use of an x-ray diffraction device, and the phase ratio thereof was found by a Rietveld analysis. In the examples, in which the content of C was lower than 1% by atom, a high ratio of the tetragonal phase not lower than 50% was obtained.

The Curie temperature was measured by a thermomagnetic analysis of reading a change in the magnetic force, in a state where a permanent magnet was attached to scales, or to the vicinity thereof, of a thermogravimetric analyzer. The results of the measurements are shown in Table 3. In the examples, in which the content of C was lower than 1% by atom, a high Curie temperature was exhibited. By contrast, in the comparative examples, in which the content of C was not lower than 1, the Curie temperature was low. In order to check whether or not the tetragonal phase was a stable phase, a part of the pieces of the second alloy in examples 17 through 20 that had been heat-treated at 600° C. for 24 hours or at 600° C. for 168 hours separately was subjected to the measurements in substantially the same manner. In each of the examples, a high ratio of the tetragonal phase not lower than 50% was obtained.

TABLE 3

| | ALLOY COMPOSITION (% BY ATOM) | | | | HEAT TREATMENT | | CURIE |
|---|---|---|---|---|---|---|---|
| | | | | | TEMPERATURE | TIME | TEMPERATURE |
| | Mn | Al | Cu | C | (° C.) | (h) | (° C.) |
| EX 17 | 50.8 | 46.3 | 2.4 | 0.5 | 600 | 1 | 289 |
| EX 18 | 50.3 | 46.4 | 2.5 | 0.8 | 600 | 1 | 273 |
| EX 19 | 49.8 | 47.4 | 2.5 | 0.2 | 600 | 1 | 277 |

TABLE 3-continued

| | ALLOY COMPOSITION (% BY ATOM) | | | | HEAT TREATMENT | | CURIE |
|---|---|---|---|---|---|---|---|
| | | | | | TEMPERATURE | TIME | TEMPERATURE |
| | Mn | Al | Cu | C | (° C.) | (h) | (° C.) |
| EX 20 | 50.0 | 47.1 | 2.4 | 0.5 | 600 | 1 | 281 |
| COMPARATIVE EX 1 | 49.9 | 46.0 | 2.5 | 1.7 | 600 | 1 | 243 |
| COMPARATIVE EX 1 | 49.4 | 46.9 | 2.5 | 1.3 | 600 | 1 | 232 |

Examples 21 Through 37

The elements of Mn, Al and Cu were weighed, and then quenched by use of a compact rapid quenching device. As a result, a plurality of pieces of first alloy were obtained (first step). The components of the obtained first alloy were measured by use of inductively coupled plasma optical emission spectrometry (ICP-OES). The compositions were as shown in Table 4. The obtained first alloy was put into a tubular furnace. The inside of the tubular furnace was made vacuum by use of a rotary pump, and then provided with an argon gas atmosphere. The first alloy was subjected to a heat treatment to be kept at 500° C. to 600° C. for 1 to 24 hours. As a result, a plurality of pieces of second alloy were obtained (second step).

The phase of the second alloy was identified by use of an x-ray diffraction device, and the phase ratio thereof was found by a Rietveld analysis. The magnetic characteristics thereof were measured by use of a vibrating sample magnetometer. The results of the measurements are shown in Table 4. In each of the examples, a high ratio of the tetragonal phase not lower than 50% was obtained. In order to check whether or not the tetragonal phase was a stable phase, a part of the pieces of the second alloy that had been heat-treated at 500° C. to 600° C. for a time period not shorter than hours separately was subjected to the measurements in substantially the same manner. In each of the examples, a high ratio of the tetragonal phase not lower than 50% was obtained.

TABLE 4

| | ALLOY COMPOSITION (% BY ATOM) | | | HEAT TREATMENT | | RATIO OF | MAXIMUM VALUE OF |
|---|---|---|---|---|---|---|---|
| | | | | TEMPERATURE | TIME | TETRAGONAL | MAGNETIZATION |
| | Mn | Al | Cu | (° C.) | (h) | PHASE (%) | $(A \cdot m^2/kg)$ |
| EX 21 | 52.5 | 46.5 | 1.0 | 500 | 1 | 69 | 50.1 |
| EX 22 | 52.5 | 46.5 | 1.0 | 600 | 24 | 61 | 49.7 |
| EX 23 | 48.2 | 50.4 | 1.4 | 600 | 24 | 69 | 62.2 |
| EX 24 | 51.5 | 47.1 | 1.5 | 600 | 24 | 69 | 58.6 |
| EX 25 | 50.5 | 48.1 | 1.5 | 600 | 24 | 66 | 49.6 |
| EX 26 | 49.3 | 49.2 | 1.5 | 600 | 24 | 72 | 67.1 |
| EX 27 | 49.9 | 48.5 | 1.6 | 600 | 1 | 54 | 52.4 |
| EX 28 | 49.9 | 48.5 | 1.6 | 600 | 24 | 73 | 58.7 |
| EX 29 | 52.0 | 46.1 | 2.0 | 600 | 24 | 65 | 53.5 |
| EX 30 | 51.0 | 46.6 | 2.4 | 600 | 24 | 80 | 64.3 |
| EX 31 | 49.4 | 48.2 | 2.4 | 600 | 1 | 91 | 76.8 |
| EX 32 | 49.4 | 48.2 | 2.4 | 600 | 24 | 94 | 83.9 |
| EX 33 | 49.9 | 47.7 | 2.5 | 600 | 24 | 88 | 78.8 |
| EX 34 | 50.4 | 46.7 | 3.0 | 600 | 24 | 75 | 64.0 |
| EX 35 | 49.6 | 47.4 | 3.0 | 600 | 1 | 96 | 82.5 |
| EX 36 | 49.6 | 47.4 | 3.0 | 600 | 24 | 90 | 77.6 |
| EX 37 | 48.7 | 48.3 | 3.0 | 600 | 24 | 91 | 64.8 |

Examples 38 Through 54

The elements of Mn, Al, Cu and C were weighed, and then quenched by use of a compact rapid quenching device. As a result, a plurality of pieces of first alloy were obtained (first step). Among the components of the obtained first alloy, Mn, Al and Cu were measured by use of inductively coupled plasma optical emission spectrometry (ICP-OES), and C was measured by use of an infrared absorption method after combustion. The compositions were as shown in Table 5. The obtained first alloy was put into a tubular furnace. The inside of the tubular furnace was made vacuum by use of a rotary pump, and then provided with an argon gas atmosphere. The first alloy was subjected to a heat treatment to be kept at 500° C. to 700° C. for 1 to 168 hours. As a result, a plurality of pieces of second alloy were obtained (second step).

The phase of the second alloy was identified by use of an x-ray diffraction device, and the phase ratio thereof was found by a Rietveld analysis. The magnetic characteristics thereof were measured by use of a vibrating sample magnetometer. The Curie temperature was measured by a thermomagnetic analysis of reading a change in the magnetic force, in a state where a permanent magnet was attached to scales, or to the vicinity thereof, of a thermogravimetric analyzer.

The results of the measurements are shown in Table 5. In each of the examples, in which the content of C was lower than 1% by atom, a high ratio of the tetragonal phase not lower than 50% was obtained, and a high Curie temperature was exhibited. In order to check whether or not the tetragonal phase was a stable phase, a part of the pieces of the second alloy that had been heat-treated at 500° C. to 700° C. for a time period not shorter than 24 hours separately was subjected to the measurements in substantially the same manner. In each of the examples, a high ratio of the tetragonal phase not lower than 50% was obtained.

TABLE 5

| | ALLOY COMPOSITION (% BY ATOM) | | | | HEAT TREATMENT | | RATIO OF TETRAGONAL PHASE (%) | MAXIMUM VALUE OF MAGNETIZATION ($A \cdot m^2/kg$) | CURIE TEMPERATURE (° C.) |
|---|---|---|---|---|---|---|---|---|---|
| | Mn | Al | Cu | C | TEMPERATURE (° C.) | TIME (h) | | | |
| EX 38 | 50.8 | 46.3 | 2.4 | 0.5 | 700 | 1 | 86 | 72.3 | 263 |
| EX 39 | 50.8 | 46.3 | 2.4 | 0.5 | 700 | 24 | 81 | 71.0 | 258 |
| EX 40 | 50.8 | 46.3 | 2.4 | 0.5 | 700 | 168 | 76 | 68.1 | 259 |
| EX 41 | 50.3 | 46.4 | 2.5 | 0.8 | 500 | 1 | 83 | 66.5 | 277 |
| EX 42 | 50.3 | 46.4 | 2.5 | 0.8 | 500 | 24 | 89 | 59.6 | 270 |
| EX 43 | 50.3 | 46.4 | 2.5 | 0.8 | 700 | 1 | 100 | 86.2 | 260 |
| EX 44 | 50.3 | 46.4 | 2.5 | 0.8 | 700 | 24 | 94 | 84.3 | 256 |
| EX 45 | 50.3 | 46.4 | 2.5 | 0.8 | 700 | 168 | 92 | 74.5 | 257 |
| EX 46 | 50.0 | 47.1 | 2.4 | 0.5 | 500 | 1 | 86 | 70.4 | 285 |
| EX 47 | 50.0 | 47.1 | 2.4 | 0.5 | 500 | 24 | 93 | 61.9 | 280 |
| EX 48 | 50.0 | 47.1 | 2.4 | 0.5 | 700 | 1 | 94 | 82.0 | 254 |
| EX 49 | 50.0 | 47.1 | 2.4 | 0.5 | 700 | 24 | 100 | 84.2 | 255 |
| EX 50 | 50.0 | 47.1 | 2.4 | 0.5 | 700 | 168 | 93 | 82.0 | 256 |
| EX 51 | 49.8 | 47.4 | 2.5 | 0.2 | 700 | 1 | 66 | 62.6 | 270 |
| EX 52 | 49.8 | 47.4 | 2.5 | 0.2 | 700 | 24 | 56 | 53.5 | 264 |
| EX 53 | 49.8 | 47.4 | 2.5 | 0.2 | 700 | 168 | 51 | 50.8 | 265 |
| EX 54 | 49.0 | 47.9 | 2.5 | 0.6 | 600 | 1 | 83 | 71.9 | 273 |

Example 55

A first alloy and a second alloy were produced in substantially the same manner as in example 1 except that the weights of the elements of Mn, Al and Cu were different. The components, the crystal structure, and the phase ratio of the obtained second alloy were measured in substantially the same manner as in example 1. The components were $Mn_{49.5}Al_{49.0}Cu_{2.5}$ (% by atom), and the main phase was confirmed to be a tetragonal phase. The phase ratio of the tetragonal phase was 96%. The second alloy was pulverized into a size not larger than 425 μm and then fine-pulverized by a planetary ball mill to obtain fine-pulverized powder having a particle size $D_{50}$ of 22 μm (alloy preparation step). The particle size $D_{50}$ is a central value of volume (volume-based median diameter) obtained by an airflow-dispersion laser diffraction method. The fine-pulverized powder was kept at 600° C. for 10 minutes while being supplied with a pressure of 100 MPa by a vacuum hot press device to produce a permanent magnet bulk (densification step). The obtained permanent magnet bulk was magnetized by a pulse magnetizer applying a magnetic field of 7 T, and then the magnetic characteristics thereof were measured by use of a vibrating sample magnetometer applying a magnetic field of 2 T at the maximum. The maximum value of magnetization was as high as 63.6 A·m²/kg. The obtained permanent magnet bulk was pulverized into a size not larger than 75 μm. The crystal structure thereof was measured by use of an x-ray diffraction device, and the phase ratio thereof was measured by use of a Rietveld analysis. The ratio of the tetragonal phase was 91%. Such a high phase ratio was exhibited even after the pulverization step and the sintering step.

Examples 56 Through 81

The elements of Mn, Al, Cu and C were weighed, and then quenched by use of a compact rapid quenching device. As a result, a plurality of pieces of first alloy were obtained (first step). Among the components of the obtained first alloy, Mn, Al and Cu were measured by use of inductively coupled plasma optical emission spectrometry (ICP-OES), and C was measured by use of an infrared absorption method after combustion. The compositions were as shown in Table 6. The obtained first alloy was put into a tubular furnace. The inside of the tubular furnace was made vacuum by use of a rotary pump, and then provided with an argon gas atmosphere. The first alloy was subjected to a heat treatment to be kept at 500° C. to 700° C. for 1 to 168 hours. As a result, a plurality of pieces of second alloy were obtained (second step).

The phase of the second alloy was identified by use of an x-ray diffraction device, and the phase ratio thereof was found by a Rietveld analysis. The magnetic characteristics thereof were measured by use of a vibrating sample magnetometer. The Curie temperature was measured by a thermomagnetic analysis of reading a change in the magnetic force, in a state where a permanent magnet was attached to scales, or to the vicinity thereof, of a thermogravimetric analyzer.

The results of the measurements are shown in Table 6. In each of the examples, in which the content of C was lower than 1% by atom, a high ratio of the tetragonal phase not lower than 50% was obtained, and a high Curie temperature was exhibited. In order to check whether or not the tetragonal phase was a stable phase, a part of the pieces of the second alloy that had been heat-treated at 500° C. to 700° C. for a time period not shorter than 24 hours separately was subjected to the measurements in substantially the same manner. In each of the examples, a high ratio of the tetragonal phase not lower than 50% was obtained.

TABLE 6

| | ALLOY COMPOSITION (% BY ATOM) | | | | HEAT TREATMENT | | RATIO OF TETRAGONAL PHASE (%) | MAXIMUM VALUE OF MAGNETIZATION (A · m²/kg) | CURIE TEMPERATURE (° C.) |
|---|---|---|---|---|---|---|---|---|---|
| | Mn | Al | Cu | C | TEMPERATURE (° C.) | TIME (h) | | | |
| EX 56 | 50.5 | 47.7 | 1.0 | 0.8 | 500 | 24 | 68 | 56.1 | 254 |
| EX 57 | 50.5 | 47.7 | 1.0 | 0.8 | 600 | 1 | 82 | 74.5 | 256 |
| EX 58 | 50.5 | 47.7 | 1.0 | 0.8 | 700 | 1 | 77 | 67.3 | 265 |
| EX 59 | 50.5 | 47.7 | 1.0 | 0.8 | 700 | 24 | 75 | 65.0 | 263 |
| EX 60 | 50.5 | 47.7 | 1.0 | 0.8 | 700 | 168 | 72 | 64.2 | 262 |
| EX 61 | 51.5 | 46.2 | 1.5 | 0.8 | 500 | 1 | 91 | 72.8 | 280 |
| EX 62 | 51.5 | 46.2 | 1.5 | 0.8 | 500 | 24 | 89 | 71.7 | 272 |
| EX 63 | 51.5 | 46.2 | 1.5 | 0.8 | 500 | 168 | 88 | 55.9 | 263 |
| EX 64 | 51.5 | 46.2 | 1.5 | 0.8 | 600 | 1 | 97 | 71.6 | 271 |
| EX 65 | 51.5 | 46.2 | 1.5 | 0.8 | 700 | 1 | 95 | 80.9 | 263 |
| EX 66 | 51.5 | 46.2 | 1.5 | 0.8 | 700 | 24 | 89 | 79.0 | 259 |
| EX 67 | 51.5 | 46.2 | 1.5 | 0.8 | 700 | 168 | 87 | 77.1 | 259 |
| EX 68 | 50.5 | 47.2 | 1.5 | 0.8 | 500 | 1 | 72 | 56.0 | 267 |
| EX 69 | 50.5 | 47.2 | 1.5 | 0.8 | 500 | 24 | 86 | 65.2 | 273 |
| EX 70 | 50.5 | 47.2 | 1.5 | 0.8 | 600 | 1 | 91 | 85.6 | 271 |
| EX 71 | 50.5 | 47.2 | 1.5 | 0.8 | 700 | 1 | 89 | 76.5 | 256 |
| EX 72 | 50.5 | 47.2 | 1.5 | 0.8 | 700 | 24 | 89 | 76.7 | 256 |
| EX 73 | 50.5 | 47.2 | 1.5 | 0.8 | 700 | 168 | 87 | 77.9 | 255 |
| EX 74 | 49.4 | 48.5 | 1.5 | 0.6 | 700 | 1 | 68 | 60.3 | 258 |
| EX 75 | 49.4 | 48.5 | 1.5 | 0.6 | 700 | 24 | 62 | 59.9 | 256 |
| EX 76 | 49.4 | 48.5 | 1.5 | 0.6 | 700 | 168 | 64 | 61.2 | 255 |
| EX 77 | 49.7 | 47.6 | 2.0 | 0.6 | 600 | 1 | 55 | 67.0 | 263 |
| EX 78 | 49.7 | 47.6 | 2.0 | 0.6 | 700 | 1 | 67 | 58.9 | 258 |
| EX 79 | 49.7 | 47.6 | 2.0 | 0.6 | 700 | 24 | 68 | 61.2 | 256 |
| EX 80 | 49.7 | 47.6 | 2.0 | 0.6 | 700 | 168 | 68 | 59.4 | 255 |
| EX 81 | 48.7 | 47.6 | 3.0 | 0.6 | 500 | 24 | 74 | 45.9 | 262 |

Examples 82 Through 87

A second alloy was produced in substantially the same manner as in example 55 and pulverized to obtain fine-pulverized powder (alloy preparation step). The fine-pulverized powder was kept at 450° C. to 700° C. for 12 minutes while being supplied with a pressure of 200 MPa or 400 MPa by a vacuum hot press device to produce a permanent magnet bulk (densification step). The obtained permanent magnet bulk was magnetized by a pulse magnetizer applying a magnetic field of 7 T, and then the magnetic characteristics thereof were measured by use of a vibrating sample magnetometer applying a magnetic field of 2 T at the maximum. The obtained permanent magnet bulk was pulverized into a size not larger than 75 μm. The crystal structure thereof was measured by use of an x-ray diffraction device, and the phase ratio thereof was analyzed by use of a Rietveld analysis. The magnetic characteristics thereof were measured by use of a vibrating sample magnetometer.

The results of the measurements are shown in Table 7. In each of the examples, a high maximum value of magnetization was exhibited. In each of the examples, the obtained powder exhibited a high ratio of the tetragonal phase not lower than 70%.

TABLE 7

| | ALLOY COMPOSITION (% BY ATOM) | | | DENSIFICATION | | RATIO OF TETRAGONAL PHASE (%) | MAXIMUM VALUE OF MAGNETIZATION (A · $m^2$/kg) |
|---|---|---|---|---|---|---|---|
| | Mn | Al | Cu | TEMPERATURE (° C.) | TIME (h) | | |
| EX 82 | 49.5 | 49.0 | 2.5 | 450 | 400 | 93 | 65.5 |
| EX 83 | 49.5 | 49.0 | 2.5 | 500 | 400 | 91 | 62.2 |
| EX 84 | 49.5 | 49.0 | 2.5 | 550 | 200 | 92 | 58.7 |
| EX 85 | 49.5 | 49.0 | 2.5 | 600 | 200 | 86 | 61.0 |
| EX 86 | 49.5 | 49.0 | 2.5 | 650 | 200 | 89 | 68.7 |
| EX 87 | 49.5 | 49.0 | 2.5 | 700 | 200 | 71 | 59.9 |

Examples 88 Through 94

A second alloy was produced in substantially the same manner as in example 55 and pulverized to obtain fine-pulverized powder. A part of the fine-pulverized powder was kept non-heat-treated. The remaining part thereof was encapsulated in a quartz tube having an argon gas atmosphere and subjected to a heat treatment to be kept at 300° to 600° for 12 minutes in a heating furnace. The non-heat-treated powder and the heat-treated powder were secured with paraffin without being densified, and then magnetized by a pulse magnetizer applying a magnetic field of 7 T. The magnetic characteristics thereof were measured by use of a vibrating sample magnetometer applying a magnetic field of 2 T at the maximum.

The results of the measurements are shown in Table 8. In each of the examples, a high maximum value of magnetization was exhibited. The crystal structure of each of the non-heat-treated powder and the heat-treated powder was measured by use of an x-ray diffraction device, and the phase ratio thereof was analyzed by use of a Rietveld analysis. In each of the examples, the non-heat-treated powder and the heat-treated powder exhibited a high ratio of the tetragonal phase not lower than 90%.

TABLE 8

| | ALLOY COMPOSITION (% BY ATOM) | | | HEAT TREATMENT TEMPERATURE ON POWDER (° C.) | RATIO OF TETRAGONAL PHASE (%) | MAXIMUM VALUE OF MAGNETIZATION (A · $m^2$/kg) |
|---|---|---|---|---|---|---|
| | Mn | Al | Cu | | | |
| EX 88 | 49.5 | 49.0 | 2.5 | — | 96 | 53.5 |
| EX 89 | 49.5 | 49.0 | 2.5 | 300 | 95 | 60.2 |
| EX 90 | 49.5 | 49.0 | 2.5 | 350 | 96 | 70.0 |
| EX 91 | 49.5 | 49.0 | 2.5 | 400 | 95 | 76.8 |
| EX 92 | 49.5 | 49.0 | 2.5 | 450 | 94 | 77.4 |
| EX 93 | 49.5 | 49.0 | 2.5 | 500 | 92 | 71.4 |
| EX 94 | 49.5 | 49.0 | 2.5 | 600 | 90 | 74.2 |

INDUSTRIAL APPLICABILITY

A permanent magnet alloy and a permanent magnet provided by the present disclosure may be preferably used for permanent magnets for motors of automobiles, railroad equipment, home appliances, industrial equipment and the like.

The invention claimed is:

1. A permanent magnet alloy, comprising:

Mn at a content not lower than 41% by atom and not higher than 53% by atom;

Al at a content not lower than 46% by atom and not higher than 53% by atom;

Cu at a content not lower than 0.5% by atom and not higher than 10% by atom, and C at a content lower than 0.8% by atom including 0% by atom, wherein the permanent magnet alloy contains a stable phase, having a tetragonal structure, at a ratio not lower than 50% by mass.

2. The permanent magnet alloy of claim 1, wherein the permanent magnet alloy comprises:

Mn at a content not lower than 44% by atom and not higher than 53% by atom;

Al at a content not lower than 46% by atom and not higher than 51.5% by atom; and Cu at a content not lower than 0.5% by atom and not higher than 7% by atom.

3. The permanent magnet alloy of claim 1, wherein the permanent magnet alloy comprises:

Mn at a content not lower than 45% by atom and not higher than 51.5% by atom;

Al at a content not lower than 46% by atom and not higher than 50% by atom; and

Cu at a content not lower than 0.5% by atom and not higher than 5% by atom.

4. The permanent magnet alloy of claim 1, wherein a total content of Mn, Al, Cu and C is 100% by atom (the permanent magnet alloy may contain unavoidable impurities).

5. A permanent magnet, comprising:

Mn at a content not lower than 41% by atom and not higher than 53% by atom;

Al at a content not lower than 46% by atom and not higher than 53% by atom;

Cu at a content not lower than 0.5% by atom and not higher than 10% by atom, and C at a content lower than 0.8% by atom including 0% by atom, wherein the permanent magnet contains a stable phase, having a tetragonal structure, at a ratio not lower than 50% by mass.

6. The permanent magnet of claim 5, wherein the permanent magnet comprises:

Mn at a content not lower than 44% by atom and not higher than 53% by atom;

Al at a content not lower than 46% by atom and not higher than 51.5% by atom; and Cu at a content not lower than 0.5% by atom and not higher than 7% by atom.

7. The permanent magnet of claim 5, wherein the permanent magnet comprises:

Mn at a content not lower than 45% by atom and not higher than 51.5% by atom;

Al at a content not lower than 46% by atom and not higher than 50% by atom; and

Cu at a content not lower than 0.5% by atom and not higher than 5% by atom.

* * * * *